(Model.)
D. D. SMITH.
LATHE TOOL.
No. 245,668.        Patented Aug. 16, 1881.
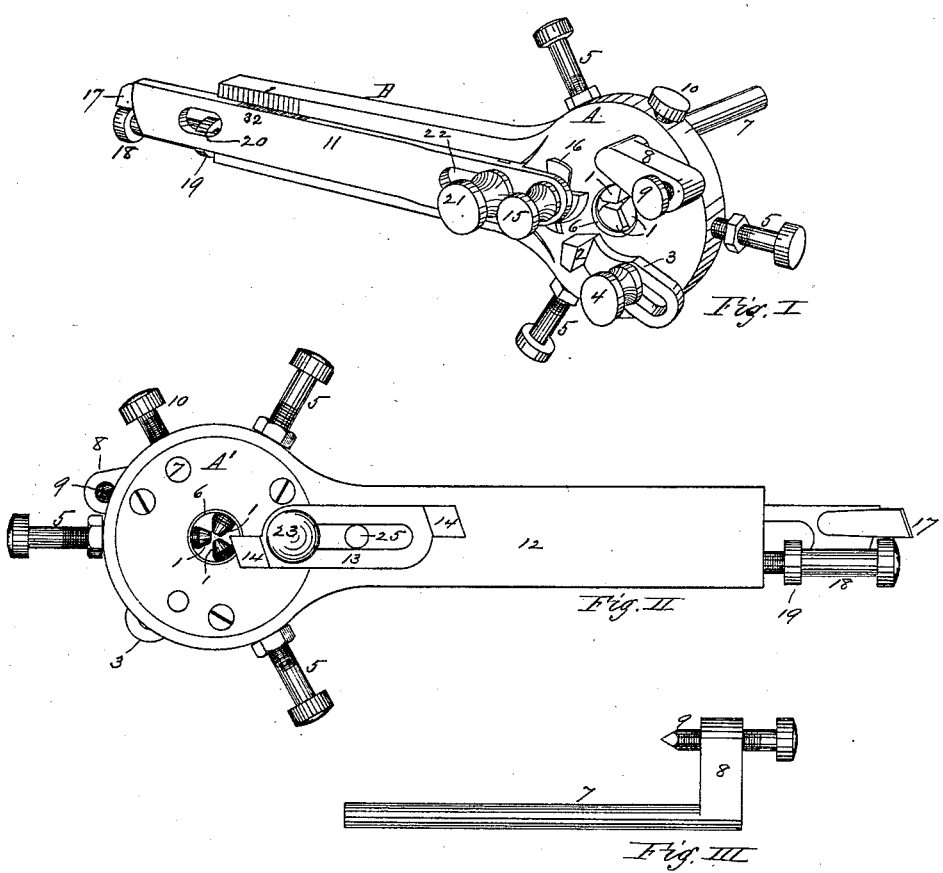
Witnesses.
Chas. H. Wood.
C. S. Hurlbut.
Inventor:
Donald D. Smith,
By T. A. Curtis,
his atty.

UNITED STATES PATENT OFFICE.

DONALD D. SMITH, OF SPRINGFIELD, MASSACHUSETTS.

LATHE-TOOL.

SPECIFICATION forming part of Letters Patent No. 245,668, dated August 16, 1881.

Application filed February 14, 1881. (Model.)

*To all whom it may concern:*

Be it known that I, DONALD D. SMITH, of Springfield, in the county of Hampden and State of Massachusetts, have invented a new and useful Lathe-Tool, which has not been patented in any foreign country to any person with my knowledge and consent, and of which the following is a specification.

The object of my invention is to provide a convenient tool to be secured in the tool-post of a lathe, and to be used, in connection with the lathe, for various purposes in turning, centering, &c., and in many processes and operations required in the working of metals; and it consists of movable jaws combined with and operating in a head attached to a shank with other devices connected therewith, all of which will be more fully hereinafter described; and my invention is illustrated in the accompanying drawings, in which—

Figure I is a perspective view of my invention. Fig. II is a side view of the same; and Fig. III is a side view of the centering and gaging device connected with the tool as one of the features combined therewith.

In the drawings, B represents a shank, of sufficient size and length, to be adjusted and secured in the tool-post of a lathe in such a position that the central aperture, 6, in the head A shall coincide with the axis of the face-plate or the centers in a lathe. The head A may be counterbored on one side and the side plate, A', fitted therein, as shown clearly in Fig. II, in which case, if desired, suitable guideways or slots may be made inside the head A or on the inside of the plate A', into which to insert a series of jaws, 1, operating toward the center of the head A, in which case such jaws may be made of block form, and slide in and out toward and from the center of the head in said guideways, and be limited in their movement by the adjusting-screws 5; or the head A may be made solid, and threaded holes may be made therein edgewise, into which the screws 5 may may be turned, said screws terminating in jaws at the center of the head, as shown clearly in Fig. II. It is not essential, however, that these jaws 1 shall be limited to this particular construction, inasmuch as they may be operated in the same manner as the jaws in a universal chuck are operated and yet answer the purpose.

The shank B has a groove or channel made in its side, in which is fitted to slide freely therein a piece, 11, made suitably strong, and slotted for a portion of its length, through which slot is inserted a set-screw, 21, turned into a threaded hole in the shank, and a recess, 20, is made in one or both ends of the piece 11, in which engages a collar, 19, on the set-screw 18, turned into a threaded hole in the end of the shank, so that by loosening the set-screw 21 the piece 11 may be adjusted either in or out by turning the screw 18 in either direction.

A series of cutters, as 16, may be arranged in a circular group and attached to a knob, 15, so that by loosening the set-screw 21 any one of the series of cutters 16 may be brought into position, and there secured by tightening set-screw 21, to operate upon a piece of metal extending through the head between the jaws 1. A cutter, 17, may also be fitted and secured in the opposite end of the piece 11, so that by the latter may be removed from the shank B by removing the set-screw 21, and reversed with the cutter 17 in position to operate upon metal extending through the head and between the jaws 1, the piece 11 being slotted at both ends to receive the set-screw 21.

A slotted piece, 3, having a rest, 2, made on one end, is secured to the side of the head by the set-screw 4, turned into a threaded hole therein, so that the rest 2 may be brought up into any desired position adjacent to the central aperture, 6, and there secured by turning the set-screw 4.

A rod, 7, provided with an arm, 8, extends through a hole in the head A, and said arm has a threaded hole made therein extending in the same direction as the rod, and this threaded hole is provided with a pointed screw, 9, which may be turned in and out of said hole, and is located at such distance from the axis of the rod 7 that when the arm 8 is turned down in front of the central aperture, 6, the center of the pointed screw 9 may coincide with the axis of the center of the lathe, or of its face-plate.

A slotted piece, 13, upon which is made a cutting-tool, as 14, one at each end, may be secured to the side of the tool by the set-screw 23, turned into the side of the tool, and a short stud, as 25, or the end of the set-screw 21, turned into and through the shank, may project from the side of the shank into the slot of the piece 13, so that when the set-screw 23 is turned up snugly the said piece will be more firmly secured in place.

In using the tool above described the shank 12 is adjusted in the ordinary tool-post of a lathe with the central aperture, 6, coincident with the axes of the lathe-centers, and if the metal to be operated upon is small in diameter the tool-post is moved so that the head A may be quite near to the face plate or chuck of the lathe, and the piece to be operated upon is secured in the face plate or chuck of the lathe and extending in between the jaws 1, the latter having been previously drawn out to insert said piece. The jaws 1 are then turned in so that said piece has a bearing against the ends of the jaws, and yet so as to turn freely, and any one of the cutting-tools, either in the group 16 or that at the opposite end of the piece 11, may be brought into position to cut or operate upon the piece projecting through the jaws, the said piece having a firm bearing against the jaws, and thereby being prevented from springing.

If it is desired to extend the piece of metal being operated upon through the head A and between the jaws to any certain or desired distance beyond, the set-screw 10 is loosened, the arm 8 is turned down, so that the pointed screw 9 is brought in front of the end of said piece, and is there secured by the set-screw 10, and the screw 9 is turned either in or out and operates as a gage to determine the distance which the piece being wrought or operated upon should project through the head. If it is desired to use the screw 9 for the purpose of centering said piece of metal, as is often required to be done, the piece is adjusted between the jaws 1, as above mentioned, the screw 9 is adjusted in front of the aperture 6, at its axis, and the screw 9 is turned up against the end of said piece of metal, and a mark made thereon across that portion near its center while said piece is stationary by the screw-point. The screw being thus moved away from the end of said piece, the latter is partially revolved, and then, while stationary, another mark is made across its end by the point of the screw 9, and the point of intersection of the two marks so made will indicate the center of the piece of metal. If it is desired to finish up a piece of metal thus adjusted between the jaws 1 by a hand-tool, the screw 21 and the piece 11 may be removed, and the screw 4 being loosened the rest 2 may be moved into the desired relative position to the aperture 6, and to the metal extending between the jaws, and there secured by turning in the set-screw 4. The piece may then be finished up by a hand-tool, using the piece 2 as a rest therefor. If it is desired to turn up an irregular piece of metal, the latter is fixed in the chuck of the lathe, the screws 5 and the jaws 1 being turned out sufficiently to escape interference with the work, a part of the piece at the end is turned up approximately to the desired size by the tool 14, the desired feed-motion being given to the tool-post in the ordinary manner, so that as the turned part of the metal extends through the aperture 6 in the head the jaws 1 may be turned in against the turned-up part of the metal and the finish given thereto by the cutting-tool on the opposite side of the head, the jaws 1 serving as a bearing to steady the work, and the tool on each side of the head cutting and finishing at the same time.

If desired, a scale, as shown in Fig. 1, may be made upon the shank, and a vernier upon the sliding piece 11, so that the piece of metal being operated upon may have the desired cut made by the cutting-tool adjusted by means of this scale, instead of using calipers, as in the ordinary manner.

The head A may, as before mentioned, be made solid or hollow and provided with guide-ways for the jaws 1, which latter may be operated by any desired chuck mechanism for operating the jaws; but when operated by what is known as a "universal chuck movement"—that is, where all the jaws are moved together and at the same time—the axis or point where the jaws meet will always remain the same, whereas if each jaw is moved independently the point where the jaws meet may be changed or thrown to either side of the axis. I prefer, therefore, to use screws operating each jaw independently of the others.

It will thus be seen that this tool, when secured in the tool-post of a lathe, may be used for a great variety of purposes in operating and working metals, and that especially in operating upon rods of very small size or of small diameter the liability of their springing while being cut or otherwise operated upon is very much diminished, consequently insuring very much greater accuracy, especially in small work.

Having thus described my invention, what I claim as new is—

1. The combination, in a lathe-tool, of a shank and head provided with radially-operating jaws and a central aperture and an adjustable rest for a bearing for a hand-tool, substantially as set forth.

2. The combination, in a lathe-tool, of a grooved shank, a head provided with radially-operating jaws and a central aperture, and a movable bar having a cutting-tool therein, adapted to be adjusted and secured at any desired point along the shank of said tool by means of an adjusting-screw, substantially as set forth.

3. The combination, in a lathe-tool, of a grooved shank, a head provided with radially-operating jaws and a central aperture, a movable bar adapted to be adjusted and secured at any desired point on said tool-shank, and a group of cutting-tools arranged to revolve in the end of said bar, substantially as set forth.

4. The combination, in a lathe-tool, of a shank, a head made thereon and provided with radially-operating jaws and a central aperture, and a centering and gaging screw turned through an arm pivoted in said head, whereby said screw may be moved down to the axis of said aperture and opposite the converging point of the jaws, substantially as described.

5. The combination, in a lathe-tool, of a shank, a head made thereon and provided with radially-operating jaws and a central aperture, and two movable bars each provided with a cutting-tool, one of said bars adapted to be adjusted and secured to one side of said chuck, and the other bar to the other side by adjusting-screws, substantially as set forth.

DONALD D. SMITH.

Witnesses:
T. A. CURTIS,
CHAS. H. WOOD.